United States Patent
Acharya et al.

(10) Patent No.: US 7,006,663 B2
(45) Date of Patent: *Feb. 28, 2006

(54) METHOD FOR BLOCK-BASED DIGITAL IMAGE WATERMARKING

(75) Inventors: Tinku Acharya, Chandler, AZ (US); Bhargab Bikram Bhattacharya, Calcutta (IN); Malay Kumar Kundu, Calcutta (IN); Suman Kumar Mitra, Shibpur (IN); Chivukula Anjaneya Murthy, Calcutta (IN)

(73) Assignee: Intel Corporation, Santa Clara, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 10/738,741

(22) Filed: Dec. 16, 2003

(65) Prior Publication Data

US 2004/0131229 A1 Jul. 8, 2004

Related U.S. Application Data

(63) Continuation of application No. 09/727,288, filed on Nov. 29, 2000, now Pat. No. 6,707,928.

(51) Int. Cl.
*G06K 9/00* (2006.01)

(52) U.S. Cl. .................................................... 382/100

(58) Field of Classification Search ............... 382/100, 382/232; 713/176, 179; 358/3.28; 348/211.5, 348/460
See application file for complete search history.

(56) References Cited

U.S. PATENT DOCUMENTS

| | | | |
|---|---|---|---|
| 6,055,321 A | 4/2000 | Numao et al. | 382/100 |
| 6,181,802 B1 | 1/2001 | Todd | 382/100 |
| 6,208,735 B1 | 3/2001 | Cox et al. | 380/54 |
| 6,442,284 B1 | 8/2002 | Gustafson et al. | 382/100 |
| 6,633,653 B1 | 10/2003 | Hobson | 382/100 |
| 6,665,417 B1 * | 12/2003 | Yoshiura et al. | 382/100 |

* cited by examiner

*Primary Examiner*—Andrew W. Johns
*Assistant Examiner*—Shervin Nakhjavan
(74) *Attorney, Agent, or Firm*—Marger Johnson & McCollom P.C.

(57) ABSTRACT

A method of encoding a watermark into a digital image. The method includes partitioning an original image into blocks and then determining a variance value of each block. The blocks are then arranged according to the variance values. A number of selected blocks are identified, where the number depends upon the size of the watermark. The blocks selected are then arranged by their location. Data from the watermark is used to replace bits in a representation of each of the selected blocks with data from the watermark. A method of decoding is also discussed.

24 Claims, 2 Drawing Sheets

METHOD FOR BLOCK-BASED DIGITAL IMAGE WATERMARKING

This application is a continuation of prior application U.S. Ser. No. 09/727,288 filed Nov. 29, 2000 now U.S. Pat. No. 6,707,928.

BACKGROUND

1. Field

This disclosure relates to digital image watermarking, more particularly to a method for inserting a watermark into blocks of an image.

2. Background

Traditionally, a watermark is an image formed on the surface of paper. When held up to a light, the watermark image can be seen in the paper. One application of such marks is to verify the authenticity of documents or other printed images. Currencies, money orders, legal documents, among many other examples, are typically printed on paper stock having the appropriate watermark. When these printed images are received, the recipient can hold the paper up to the light and verify its authenticity. Using specially 'coded' paper places an additional layer of security in the process of creating printed images.

With the advent of computer networks, including the Internet, many images are copied from providing sites and passed around without ever being printed. It becomes problematic for image providers to track proprietary images. A copy of a digital image will typically be the exact same as the original image, unless there was some corruption in the data. Providers of these images have no way to detect if this person obtained this image in violation of intellectual property laws, or if the copy obtained belongs to the image provider. In addition, recipients of a digital image may want to ensure that the digital image received is from a particular source and is not a hoax or fabricated image. The watermark can be extracted that provides this information.

In response to this problem, a new industry of digital watermarking has arisen. A digital watermark is typically some sort of identifying image that is 'hidden' in the original image data. Digital images can have from hundreds to millions bits of data. A digital watermark is buried somewhere in the image data in such a manner that it can be extracted by those who know how and where it was buried, yet remain undetected by those that do not know the necessary information. In this way, illegal copying of images can be detected upon analysis of the image, and the individual performing the copying cannot detect and eliminate the watermark. Similarly, verification of authentic images can be performed to ensure that images received are from a particular source.

However, inserting watermarks into digital images have two problems. While the ability to bury the data in complicated methods allows for higher security, too much complication can increase processing time before the digital image data is resolved into an image. Alternatively, if the watermark is too simple, it may be removed by a simple filtering operation, rendering the watermark useless. Further, watermarks can degrade the quality of the image, as manipulation of the image data may result in objectionable artifacts.

BRIEF DESCRIPTION OF THE DRAWINGS

The invention may be best understood by reading the disclosure with reference to the drawings, wherein.

DETAILED DESCRIPTION OF THE EMBODIMENTS

Figure 1:
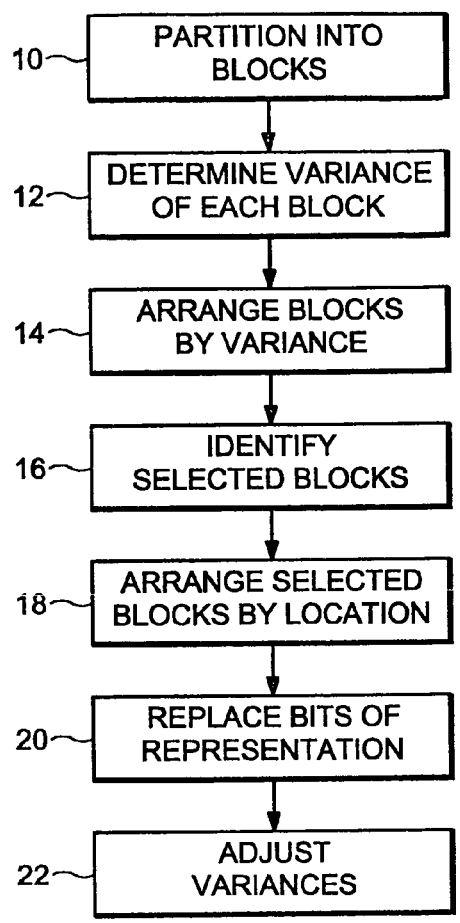
FIG. 1 shows a flowchart of one embodiment of a method for encoding a watermark into a digital image, in accordance with the invention.

One embodiment of a method for inserting a copyrighted image into a digital image is shown in FIG. 1. The image that will be watermarked will be referred to as the original image. The watermark is the image that is to be inserted into the original image. This watermark image is some sort of copyrighted image, such as a company logo. Once the insertion has been completed, the original image that has been altered by the watermark will be referred to as the watermarked image.

For purposes of this discussion an original image of 256 pixels horizontal extent by 256 lines of vertical extent (256×256), without any intention of limiting the scope of this invention. A gray scale image of 8 bits per pixel will be assumed, but any number of bits per pixel may be used. As will be seen further, the techniques of the invention may also be extended to color images, such as those having 8 bits per each color for each color red, green and blue. Also for this example, a logo image of 16 pixels by 16 lines (16×16) having 1 bit per pixel will be assumed.

Figure 2:
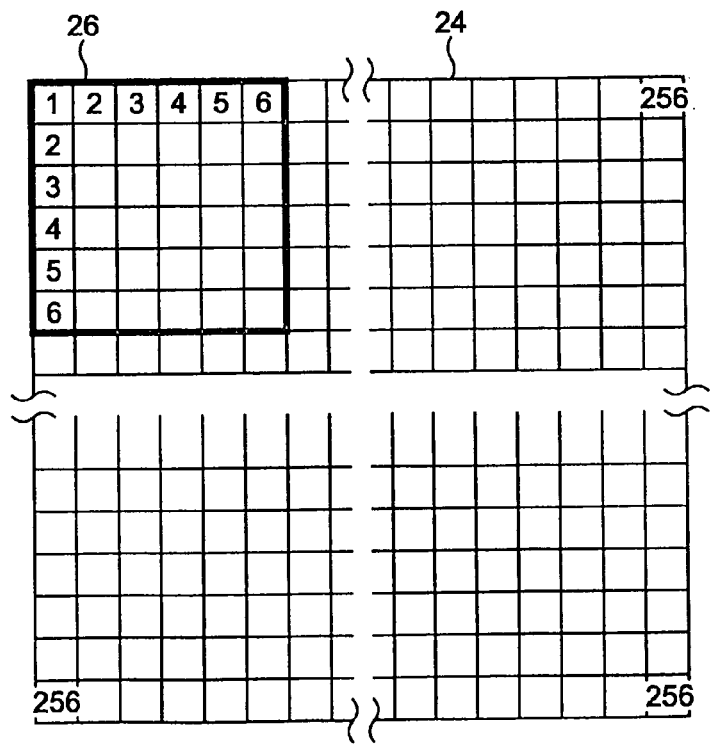
FIG. 2 shows a block diagram of an original image being divided into blocks, in accordance with the invention.

Referring now to FIG. 1, the original image such as 24 shown in FIG. 2, will be partitioned into blocks at 10. For this example, a block 26 of dimensions 6×6 will be used. At 12 the variances of all blocks is determined. For example, the number of samples in the block is 36, each a number between 0 and 255, using the assumption of 8 bits per pixel. In the following formula, each of these numbers will be $x_i$.

$$\sigma^2 = \frac{n\sum_{i=1}^{n} x_i^2 - \left(\sum_{i=1}^{n} x_i\right)^2}{n(n-1)}$$

Once the variance of each block is determined, the blocks are arranged in order by their variance values at 14. In this example, the blocks may be arranged in ascending order by their respective variance values. A block is denoted by the location of its starting pixel (i,j). Only the number of blocks needed for hiding the logo image may be selected. In this example, only two bits of the logo image will be stored in each block so in this case 128 blocks are required.

The blocks to be selected are identified at 16. In one embodiment the blocks are selected such that the mean gray level values of the blocks are either less than $T_1$ or greater than $T_2$, where $T_1$ and $T_2$ are certain two specified threshold values. The value of $T_1$ should preferably be close to '0', or the most minimum possible gray level. $T_2$ should be close to '255', or the maximum possible gray level value. However, the difference between $T_1$ and $T_2$ to '0' and '255' respectively, is relative and is strongly image dependent. Users may choose the values of $T_1$ and $T_2$ by checking the degradation in the image quality effected by the insertion of the logo.

Once the appropriate blocks are identified and selected, they may be reordered by their positions in the original image, in ascending order. For purposes of this example, an (i,j)-th block is considered less than the (k,l)-th block if $i<k$, or  (a)

$j<l$, if $i=k$.  (b)

Finally, a representation of each block is located and replaced with bits from the watermark image. In one example, the representation is the mean value of each block truncated to the nearest integer. The least two significant bit in the mean value 8-bit representation are replaced by two bits chosen from the logo image, resulting in a changed mean value. Each pixel value of each of the selected blocks is replaced by the corresponding changed mean value, making each block have zero variance.

The 16×16 watermark image can be thought of as a binary string of length 256. The first 2 bits of the string is used to modify the mean of the first selected block. The next two bits are used to modify the next chosen block and so on. This procedure may lead to minimal blocking artifacts in the watermarked image, though these may not be significant as the block size is very small compared to the size of the image. One can expect less distortion due to blocking, if the original image in which the watermark is to be hidden is of larger size.

The variance values of certain blocks that are not needed for hiding, may be too close to those of the selected blocks. This may lead to sharply delineated degradation areas in the image. To ensure robustness, variances of such blocks are adjusted at 22 by an adaptive enhancement procedure described below:

For each such block, let
  (i) mean=bl_mean(say)
  (ii) minimum gray level value=bl_min(say)
  (iii) maximum gray level value=bl_max(say)

The following relationships can be determined
  (i) bl_max−bl_mean=high difference value;
  (ii) bl_mean−bl_min=low difference value;
  (iii) new_max=bl_max+high difference value;
  (iv) new_min=bl_min−low difference value.

Replace each pixel value of the block with an adjusted pixel value based upon these relationships. For example, an adjusted pixel value could be determined by:

$$\left[\frac{(\text{new\_max} - \text{new\_min})}{(\text{bl\_max} - \text{bl\_min})}\right] * (\text{gray\_value} - \text{bl\_min}) + \text{new\_min}$$

In this procedure, the mean of each block will remain unchanged, whereas the variance of each block is increased resulting graceful degradation of the image.

Figure 4:
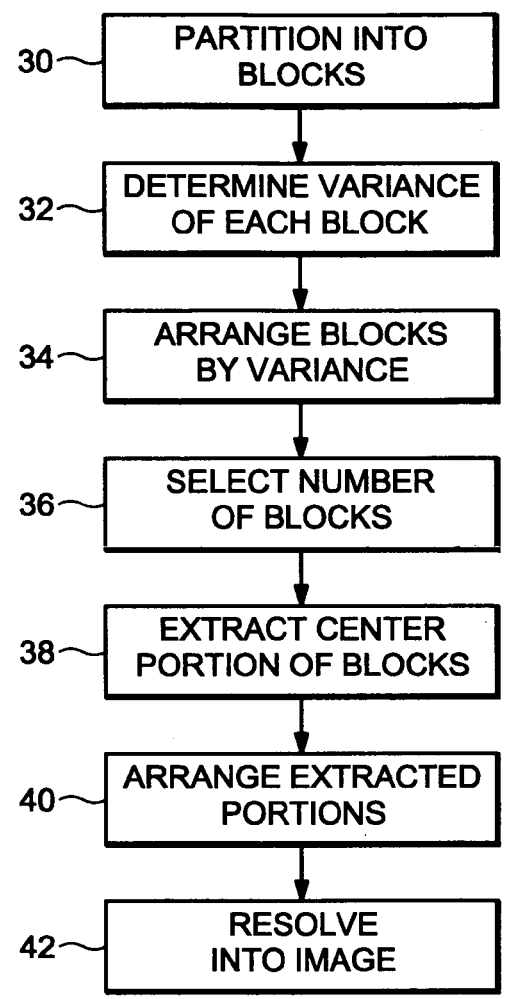
FIG. 4 shows a flowchart of one embodiment of a method for decoding a watermarked digital image.

As mentioned previously, the information used in encoding the image, including the size of the original image and the watermark image can be used to decode the image. Decoding the image is generally a reverse of the encoding procedure. An embodiment of a method for decoding an image is shown in FIG. 4.

At 30, the watermarked image is partitioned, into non-overlapping square blocks of size 6×6. The variance of each block is determined at 32. At 34, the blocks are arranged in ascending order of variances. To extract the hidden information, the decoder needs to correctly identify those blocks where the information is hidden. For this example, the encoding method shown in FIG. 1 is assumed. Therefore the information is hidden in those blocks whose variance values are small. However due to non-destructive attacks such as median or mean filtering, the variability of those blocks may change to some extent. Further, it is hard to estimate the change in their variance values. The sorting of the blocks with respect to their variance values is needed.

The sorting of the blocks is followed by the choice of 128 blocks among them at 36. The number of blocks needed is determined by the size of the watermark image, in this example a 16×16 image and two bits are used per block. One example of how to select the blocks is to compute the variance of four pixels that are at the middle of the block. For example, in a 6×6 block 24, shown in FIG. 2, pixel values at (3,3), (3,4), (4,3) and (4,4) positions are considered. It is expected that the pixel values of these four positions will be least affected by non-destructive attacks such as median and mean filters. Those blocks for which the newly computed variance values are close to zero are then selected. Note that one needs to select the number of blocks in which the information is hidden, or 128 blocks for this example.

Figure 3:
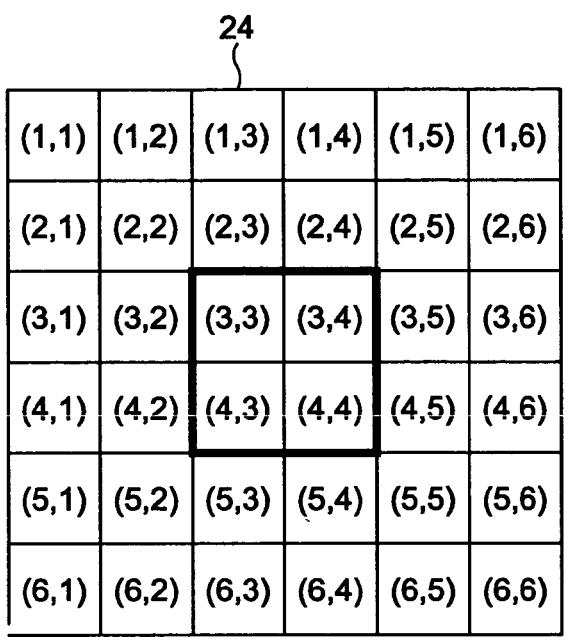
FIG. 3 shows a block diagram of a block used to partition an original image, in accordance with the invention.

At 38, the center portion of each selected block is extracted by locating a pixel lying at the middle of the block. For example, in the 6×6 block of FIG. 3, any one of the pixel values that are either at (3,3), (3,4), (4,3), or (4,4) position is considered. The two least significant bits of the selected pixel value will provide the information hidden in the block Once the center portion is extracted, in this case 2 bits per block, the extracted portions need to be arranged. The location of the block gives the position of each set of 2 bits in the logo image. All of the 128 2-bit samples are arranged in a 256-bit data string that is then resolved into the 16×16 watermark image. The ability to extract this image confirms the authenticity or source of the original image.

As a test, this method was coded in Matlab and run on a Sun Ultra-60 workstation. It was observed that if the watermarked image is corrupted by a mean filter used twice, or by a median filter used thrice, recovery of the logo can still be made. The watermarked image is found to be visually indistinguishable from the original one. The quality of digital image watermarking in the methods discussed above will depend on the relative information content of the original image and the watermark image.

The methods and processes of the invention, including the examples set out above, will probably be implemented as software code included on a computer readable medium such as a diskette, CD-ROM or downloadable file. The software code will result in implementation of the methods of the invention when that code is executed.

Thus, although there has been described to this point a particular embodiment for a method and apparatus for block-based digital image watermarking, it is not intended that such specific references be considered as limitations upon the scope of this invention except in-so-far as set forth in the following claims.

What is claimed is:

1. A method of encoding a watermark into a digital image, the method comprising:
  partitioning an original image into blocks;
  determining a variance value of each block;
  arranging the blocks according to the variance values;
  selecting some of the blocks; and
  replacing bits in a representation of each of the selected blocks with data from the watermark.

2. The method of claim 1, selecting some of the blocks further comprising identifying a number of selected blocks, wherein the number depends upon the size of the watermark.

3. The method of claim 2, wherein the identifying of a number of selected blocks further comprises selecting blocks with a mean gray level value between two thresholds.

4. The method of claim 1, the method further comprising arranging the selected blocks by location.

5. The method of claim 4, wherein the location of a block is determined by a location of a first pixel in a block.

6. The method of claim 5, wherein arranging the selected blocks by location further comprises arranging blocks with a higher horizontal position ahead of blocks with a higher vertical position.

7. The method of claim 6, wherein vertical positions will be used to arrange blocks if horizontal positions are the same.

8. The method of claim 1, wherein arranging the blocks further comprises arranging the blocks in ascending order by the variance values.

9. The method of claim 1, wherein replacing bits in a representation of each of the selected blocks further comprises:
   determining a mean value of each selected block wherein the mean value will be the representation of each block;
   truncating the mean value of each block to a nearest integer value, producing a truncated mean value;
   replacing at least two of the least significant bits of the truncated mean value with a corresponding number of bits from the watermark image producing a changed mean value; and
   replacing pixel values in each selected block with the changed mean value.

10. The method of claim 1, wherein the method further comprises:
   identifying unselected blocks having variance values near variance values of selected blocks; and
   replacing pixel values in each unselected block with an adjusted pixel value.

11. A method for decoding a watermarked image, the method comprising:
   partitioning a watermarked image into non-overlapping blocks;
   determining a variance value for each block;
   arranging the blocks in order of the variance values;
   selecting some of the blocks;
   extracting portions of selected blocks into a data string; and
   resolving the data string into the watermark image.

12. The method of claim 11, selecting some of the blocks further comprising selecting a predetermined number of blocks, wherein the number depends upon the size of a watermark encoded in the watermarked image.

13. The method of claim 11, the method further comprising identifying selected blocks, wherein a center variance of each selected block is approximately equal to zero.

14. The method of claim 13, wherein the center variance is determined by computing the variance of four center pixels of each block.

15. The method of claim 11 extracting portions of selected blocks further comprising extraction a portion of a center pixel value for each selected block.

16. The method of claim 14, wherein the center pixel value is the value of a pixel at the middle of each block.

17. The method of claim 11, arranging the blocks further comprising arranging the blocks in ascending order of the variance values.

18. The method of claim 11, wherein the portion extracted is comprised of the two least significant bits of a center pixel value.

19. A computer-readable medium including software code that, when executed, results in:
   partition of an original image into blocks;
   determination of a variance value of each block;
   arrangement of the blocks according to the variance values;
   selection of some of the blocks; and
   replacement of bits in a representation of each of the selected blocks with data from a watermark.

20. The medium of claim 19, wherein the medium also includes software code that when executed, results in arrangement the blocks according to the variance values.

21. The medium of claim 19, wherein the medium also includes software code that when executed, results in identification of a number of selected blocks, wherein the number depends upon the size of the watermark.

22. The medium of claim 21, wherein the medium also includes software code that when executed, results in arrangement of the selected blocks by location.

23. The medium of claim 22, wherein the medium also includes software code that when executed, results in:
   partition of a watermarked image into non-overlapping blocks,
   determination of a variance value for each block;
   arrangement of the blocks in order of the variance values;
   selection of a predetermined number of blocks, wherein the number depends upon the size of a watermark encoded in the watermarked image and the blocks selected have a center variance approximately equal to zero;
   extraction of a portion of a center pixel value for each selected block;
   arrangement of the portions extracted from each selected block by location of the selected block into a data string; and
   resolution of the data string into the watermark image.

24. The medium of claim 23, wherein the portion extracted is comprised of two least significant bits of data.

* * * * *